R. T. WINGO.
TESTING JACK.
APPLICATION FILED DEC. 1, 1911.
1,029,163.
Patented June 11, 1912.
3 SHEETS—SHEET 1.
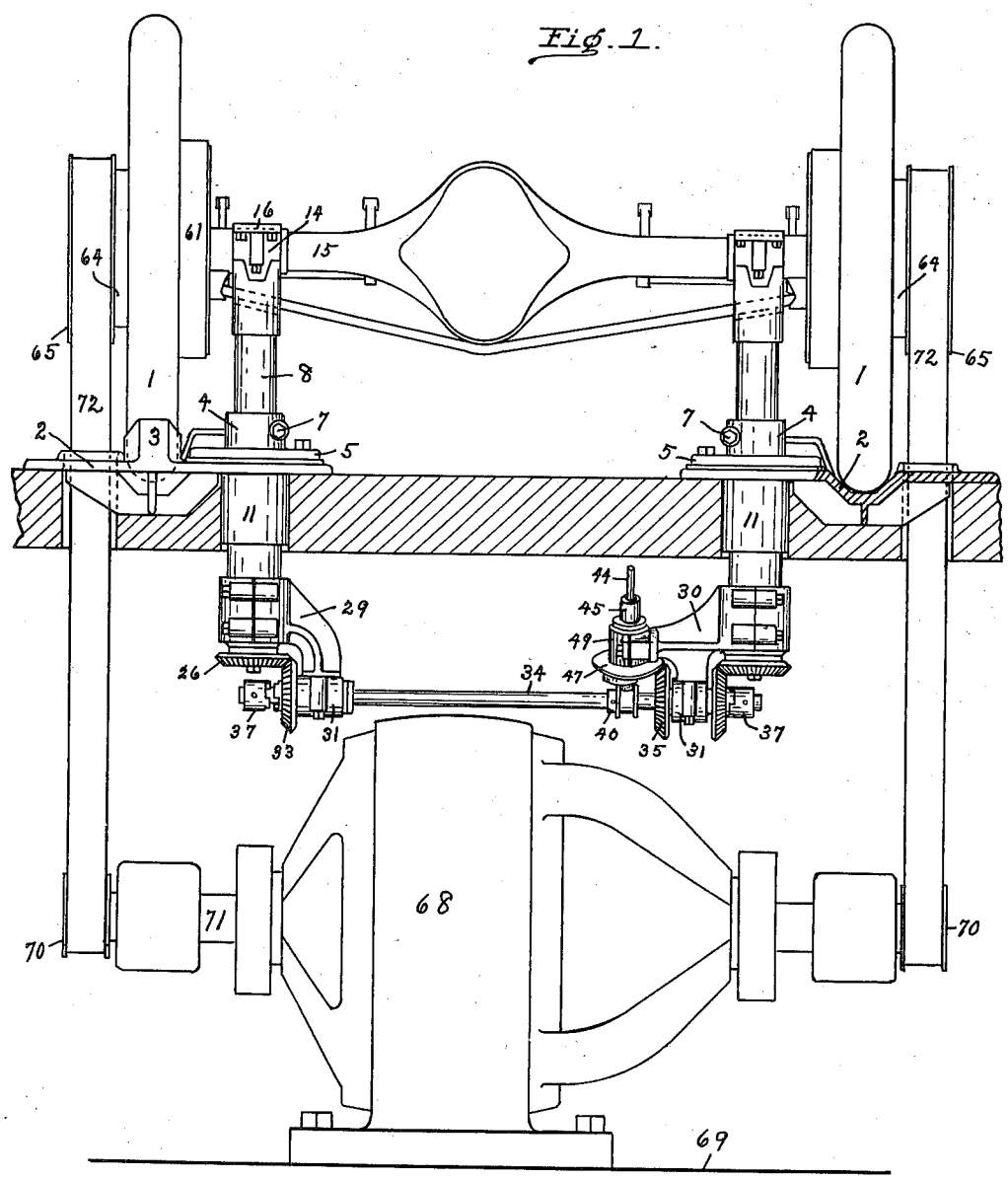
WITNESSES:
INVENTOR
Richard T. Wingo.
BY
Edward N. Pagelsen.
ATTORNEY R. T. WINGO.
TESTING JACK.
APPLICATION FILED DEC. 1, 1911.
1,029,163.
Patented June 11, 1912.
3 SHEETS—SHEET 2.
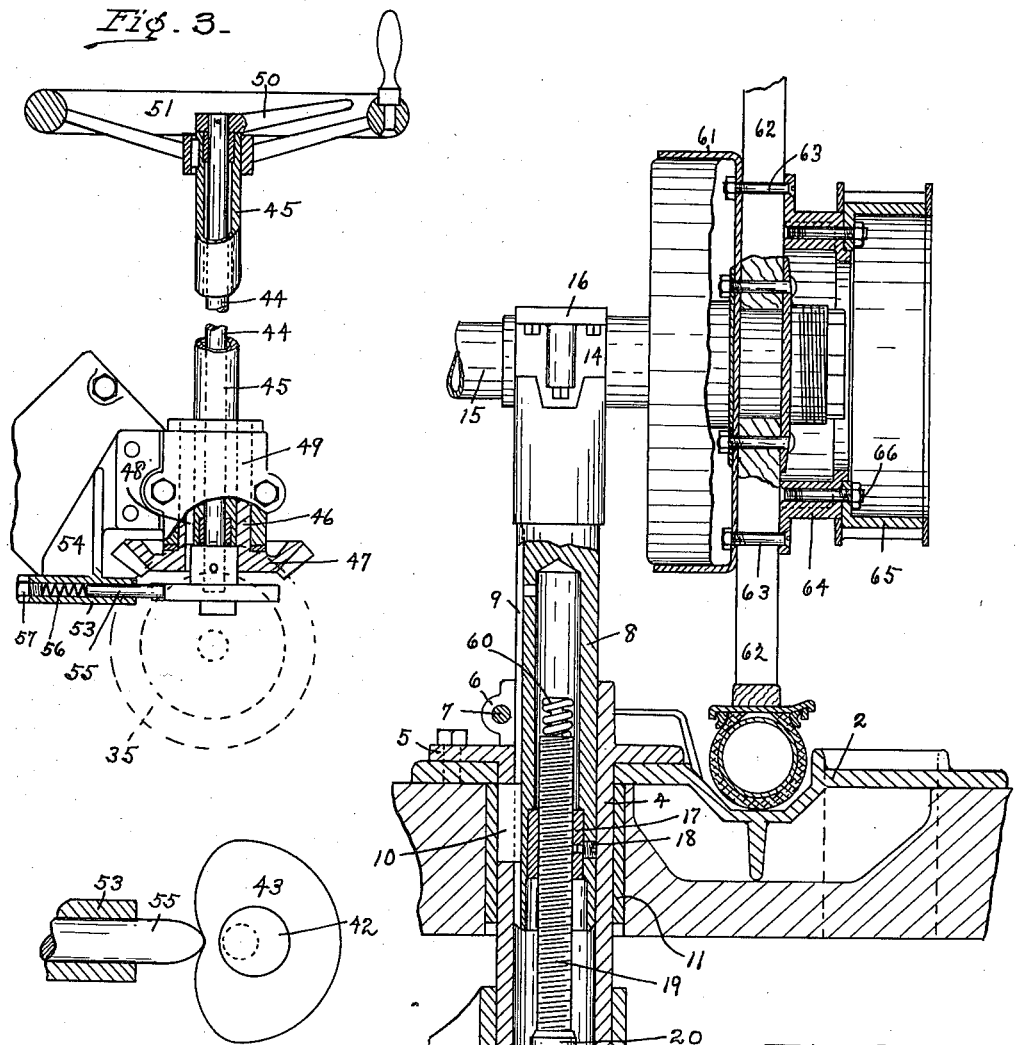

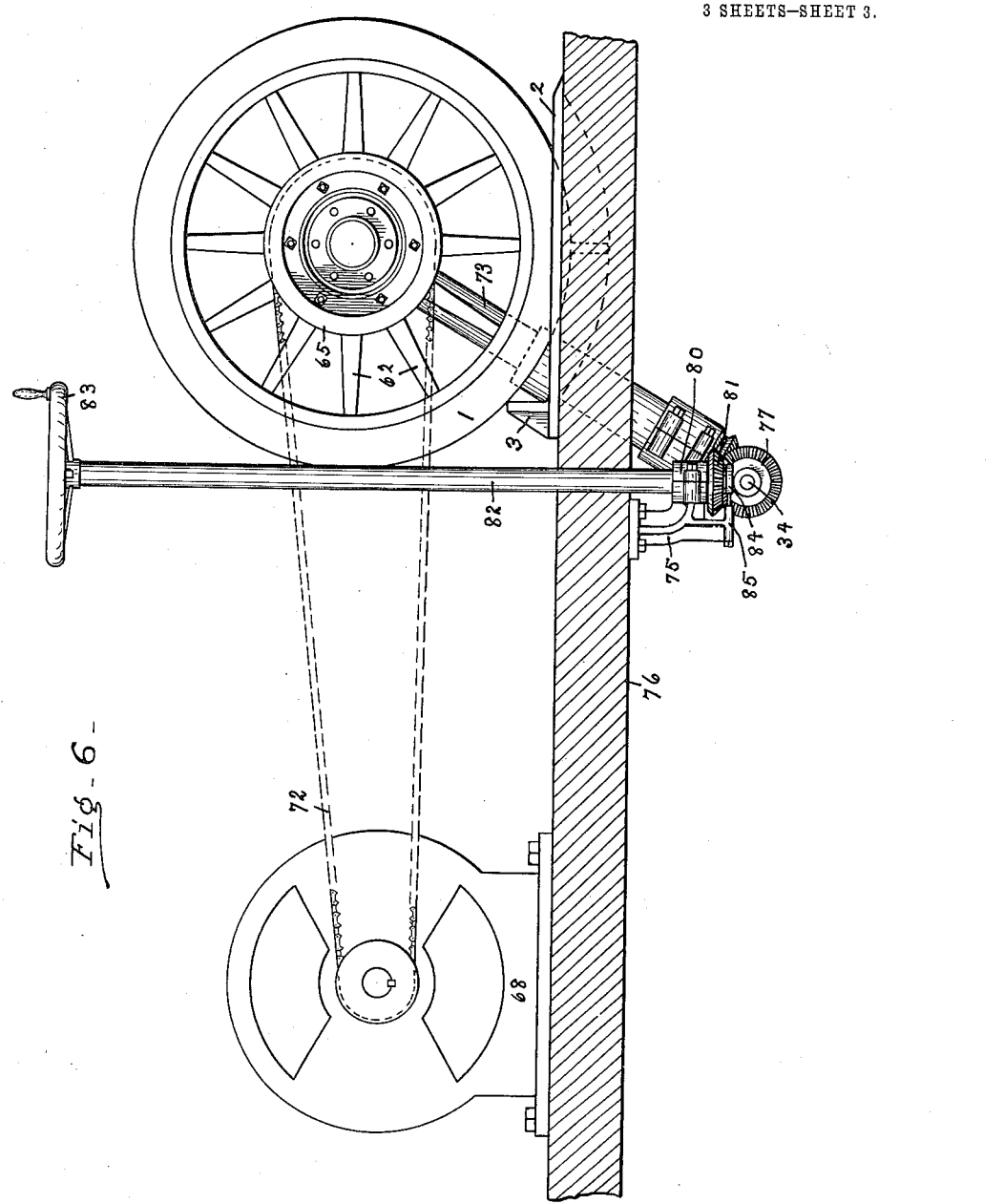

UNITED STATES PATENT OFFICE.

RICHARD T. WINGO, OF DETROIT, MICHIGAN, ASSIGNOR TO CADILLAC MOTOR CAR COMPANY, OF DETROIT, MICHIGAN, A CORPORATION OF MICHIGAN.

TESTING-JACK.

1,029,163.  Specification of Letters Patent.  Patented June 11, 1912.

Application filed December 1, 1911. Serial No. 663,221.

*To all whom it may concern:*

Be it known that I, RICHARD T. WINGO, a citizen of the United States, and a resident of Detroit, in the county of Wayne and State of Michigan, have invented a new and useful Testing-Jack, of which the following is a specification.

This construction relates to means for testing the operation of the driving mechanism of automobiles, and the object of this invention is to provide a device which shall be readily adjustable to vehicles having wheels of different diameters, which shall not obstruct the thorough examination of all the different parts, and which shall indicate the horse-power of the motor.

This invention consists in readily adjustable jacks for supporting the rear axle of the automobile which is to be tested, in combination with means, in the form of a dynamometer, for indicating the power developed by the motor of the vehicle.

In the accompanying drawings, Figure 1 is a rear elevation of a rear axle and the wheels of an automobile, together with a dynamo shown conventionally. Fig. 2 is a vertical section of a portion of a lifting jack. Fig. 3 is a side elevation and section of the operating device of the jacks at right angles to Fig. 2. Fig. 4 is a bottom plan of the cam for moving the small connecting shaft. Fig. 5 is a detail of a chain. Fig. 6 is an elevation of a modified form of construction.

Similar reference characters refer to like parts throughout the several views.

At present, it is the usual custom to test automobiles by actual use of the same upon highways. Where the output of the factory becomes very large, this requires a large force of men, and the expense of the wear and tear of the tires amounts to hundreds of dollars per month. Where several thousand automobiles are manufactured in the same city every week, this practice of testing on the city streets becomes a serious question, and results in many and often fatal accidents.

The present device is designed to avoid road tests and is adapted to permit more exact control and closer inspection than the road tests.

This device consists generally of a pair of lifting jacks, operable together or independent of each other, and adapted to rigidly support the rear axle of an automobile in such a manner that the rear wheels will be free to revolve clear of the ground. A dynamometer, preferably a dynamo having a driving pulley at each end of its shaft, is rigidly mounted directly in the plane of and preferably below the axle, and driving belts, preferably made up of links of steel, extend around these pulleys on the dynamo shaft and around pulleys which are secured to the driving wheels of the automobile. The usual indicating devices, such as voltmeters and ammeters may be employed to indicate the electrical horse-power generated by the dynamo, and therefore the power generated by the motor of the automobile. As these belts extend vertically down from the rear axle, there is nothing to prevent the tester from passing freely around the automobile and examining each of the various parts.

In order that the rear wheels 1 of the automobile shall always be in a pre-determined position when the jacks are raised, plates 2 formed with troughs may be secured to the floor as shown in Fig. 1, and may be provided with stop-blocks 3 at their rear edges. These plates support sleeves 4 which have disk-flanges 5 which rest upon and are secured to the plates 2. The upper ends of these sleeves 4 are preferably split and have lugs 6, through which the bolts 7 extend, so that these upper ends of the sleeves may be adjusted around the rams 8 of the jacks when the parts are all in proper position. These rams are preferably tubular and have key-ways 9, and the sleeves 4 are provided with keys or feathers 10 held in position by the rings 11. It will therefore be apparent that the rams 8 may be moved up and down at will, but that they cannot turn within the sleeves 4. At the upper ends of these rams are formed proper bearings 14 to support the axle 15 on which are usually secured the spring seat 16. A nut 17 may be securely held in position in the lower end of each ram 8 in any desired manner, a screw 18 preferred, and this nut receives the jack-screw 19. A collar 20 on this screw positions the collar 21, preferably of hard steel, which rests on small balls 22 supported by hard steel ring 23. This ring rests on a bushing 24 secured in the lower end of the sleeve 4, and within this bushing is revoluble the hub 25 of a bevel gear 26, which gear is secured to the lower reduced end 27 of the jack-screw 19. A key 28 may connect this gear to the screw. Secured to each sleeve 4 is a bracket 29—30, having a bearing 31 at its lower end for the hub 32 of the bevel gear 33. This hub is freely revoluble in its bearing, and within the hub the shaft 34 is both slidable and revoluble. The shaft 34 may be driven in any desired manner. That shown operates as follows. In the bearing 31 on the bracket 30 is revoluble the hub of a bevel gear 35, which connects to the shaft 34 by a key 36 secured to this shaft, and slidable in a slot in the hub of this gear 35. On each end of the shaft 34 is a collar 37 having jaws which are adapted to engage the jaws on the outer ends of the gears 32. This shaft may be so positioned that these collars 37 engage one or the other of the gears 32, or it may be so positioned that both of these gears are engaged simultaneously.

A collar 40, having circumferential flanges 41, is secured to this shaft and between these flanges extends a pin 42, eccentrically mounted on the cam 43. This cam is secured to the lower end of the rod 44 which is revoluble in a hollow shaft or tube 45. This tube extends into the hub 46 of the bevel gear 47 and is connected thereto by a key 48. This hub 46 is revolubly mounted in a bearing 49, which is secured to, or forms a part of the bracket 30. A handle 50 connects to the upper end of the rod 44, while a hand-wheel 51 may be secured to the upper end of the tube 45.

Mounted in a sleeve 53, which connects to the bearing 49 by means of plate 54, is a rod or pin 55 pressed inwardly by means of a spring 56, which spring is held in place by a screw 57. This pin bears against the heart-shaped cam 43, and normally holds it in the position shown in Fig. 5. The tube 45 and the rod 44 may extend at any desired angle to a vertical plane extending through the rams 8, but is preferably at an angle of 45 degrees to such a plane.

The usual brake-drums 61 are secured to the spokes 62 of the rear axle by bolts 63, and these bolts may be utilized to secure the rings 64 in position. Pulleys 65 may be secured to these rings 64 by means of bolts 66. A dynamo 68 is secured to any proper foundation 69, and has a pulley 70 on each end of its shaft 71. A belt 72 of any desired construction, such as for instance, that shown in Fig. 5, will extend around each wheel 65 and the pulley 70 of the dynamo immediately below it.

The distance that the rams 8 can be raised and lowered should be such that the axles of all automobiles made by the factory may be raised sufficiently to permit the wheels to revolve free from the plates 2, irrespective of the diameter of the wheels. The operation of this mechanism is as follows. When it is desired to test a car, the rams 8 are first lowered by turning the hand-wheel 51 to the right. As this is very easily done, there is a possibility that the operator may turn the jack-screws too far and cause their upper ends to strike against the upper ends of the bores of the rams. To prevent this, springs 60 may be mounted upon the upper ends of these jack-screws. When the rams are sufficiently low, the automobile is backed into position, its tires resting in the troughs in the plates 2, and the wheels engaging the plates 3. The rings 64 and pulleys 65 are then secured to the wheels of the automobile, and the belts 72 are placed on the pulleys. The hand-wheel 51 is then turned to the left, which will cause the rams to rise and lift the rear axle of the automobile until one or the other of the belts 72 is sufficiently tightened. The small handle 50 is then swung to the left or right so as to disengage one or the other of the collars 37, and its adjacent gear 32. The hand-wheel 51 is then turned farther, which will cause the engaged gear 32 to turn its respective jack-screw enough farther to cause the other belt to reach the desired tension. The motor of the automobile will then be started and all the necessary tests made. As the motor can run without attention, if desired, a number may be tested by the same operator. The usual indicating instruments connected to the dynamo 68 will show the performance of the motor, and will also indicate the horse-power developed, and therefore the fuel consumption per horse-power of the motor can be easily determined. It will also be apparent that the operator can closely observe every portion of the driving mechanism, which he cannot do when driving the car on highways. As the electricity generated by the dynamo can be used for any desired purpose in the factory, the power generated by the motor is not lost as is now the case.

Normally, the pin 42 on the cam 43 will be central, and thereby hold both of the collars 37 in engagement with their respective gears. By swinging the handle 50 in either direction, these collars will be moved out or in as the case may be, and at the same time the pin 55 will be pressed back against the spring 56. As soon as the handle 50 is released, the force of this spring and the pressure of the pin 55 against the cam 43, will turn the cam until the normal position shown in Fig. 4 is reached.

In the construction heretofore described, the rams 8 are mounted for vertical movement. It will be evident, however, that this is not absolutely necessary, and that in cases where it is desirable that the dynamometer be mounted on the floor of the testing room, that these rams be inclined from the vertical as shown in Fig. 6. The rams 73 may extend at any desired angle, and their inclination will determine whether or not the slack of the chain 72 will be taken up faster than the wheel 1 is lifted from its plate 2. All of the details of construction shown in Fig. 6 will be the same as those shown in the previous figures with the following exception.

In Fig. 1 the operating rod 44 and tube 45 are shown extending at an angle from the vertical and between the two rams. This is so that the hand-wheel 51 will be freely accessible to the operator. In Fig. 6 a bracket 75 is shown secured to the floor 76 and this bracket forms a bearing for the bevel wheel 77 which is secured to the rod 34 in the same manner as is the gear 35, previously described. This bracket 75 carries the bearing 80 for the hub of the gear 81, which meshes with the gear 77. The vertical tube 82 and the wheel 83 at the upper end of the same are similar to the tube 45 and the wheel 51, while the cam 84 below the gear 81 is similar to the cam 43 at the lower end of the rod 44. This tube 82 extends vertically and will be at the outside of the wheel 1. In Fig. 6 is also shown a small sleeve 85 which is similar to the sleeve 53 shown in Fig. 3, and will also carry mechanism to center the cam 84 as previously described.

When the rear wheels 1 of the automobile have been moved into place in the troughs in the plates 2, and the pulleys 65 have been secured thereto and the belt 72 properly positioned the rams will be actuated, causing the wheels 1 and their axle 15 to rise free of the plates 2, and at the same time move away from the dynamometer 68, thereby tightening the belts. Many other details of construction may be varied by those skilled in the art without departing from the spirit of my invention as set forth in the claims.

I claim.

1. In a testing device for automobiles, the combination of a pair of lifting jacks, means for operating the same independently or simultaneously at will, a dynamometer mounted adjacent the lifting jacks and having a shaft pulleys on each end of said shaft, pulleys adapted to be secured to the driving wheels of an automobile whose rear axle is secured to the upper ends of the lifting jacks, and belts connecting the pulleys on the dynamometer and on the rear axle.

2. In a testing device for automobiles, the combination of manually adjustable means for engaging the rear axle of an automobile and supporting the same, a dynamometer having a shaft, pulleys secured to the dynamometer shaft, pulleys adapted to be secured to the automobile axle and belts connecting the pulleys on the axle and shaft, said belts adjustable by the axle supporting means.

3. In a testing device for automobiles, the combination of a pair of sleeves, a ram in each sleeve formed with proper means at its upper end to engage the rear axle of an automobile, a jack-screw mounted in each sleeve and a nut in each ram in which said screw engages, a gear on the lower end of each screw, a slidable shaft, means to revolve the same, a gear meshing with each gear secured to the jack-screw, and means for operatively connecting the shaft to either or both of said gears at will.

4. In a testing device for automobiles, the combination of a pair of plates secured to the floor and having troughs to receive the rear wheels of an automobile, a lifting jack adjacent to each trough and comprising a sleeve mounted on one of said plates and a hollow ram slidable in the sleeve, a bearing at the upper end of each ram to engage the axle of the automobile adjacent a wheel, a nut in the lower end of each ram, a jack-screw carried by the lower end of each sleeve and engaging in a nut in a ram, a bevel gear secured to the lower end of each screw, a horizontal bearing in each bracket, a bevel-gear mounted in each bearing and engaging the bevel-gear on the adjacent jack-screw, and means to turn the gears in either direction at will, either singly or together.

5. In a testing device for automobiles, the combination of means to support the rear axle of an automobile and the wheels on the ends of the axle, a spacing ring adapted to be secured to the outer sides of each wheel, driving gears secured to said rings, a dynamometer mounted with its shaft substantially parallel to the axle and having gears at the ends of its shaft, and flexible driving members extending around the gears on the dynamometer and on the axle.

6. In a testing device for automobiles, the combination of a pair of lifting jacks, a screw to elevate each jack, gears to operate said screws simultaneously or independently at will, a dynamometer mounted adjacent the lifting jacks and having a shaft, pulleys on said shaft and other pulley adapted to be secured to the driving wheels of an automobile whose rear axle is supported by said lifting jacks, and belts connecting the pulleys on the dynamometer shaft and on the rear axle.

7. In a testing device for automobiles, the combination of lifting jacks to support the rear axle of an automobile and the wheels on the ends of the axle, driving gears adapted to be secured to said wheels, a dynamometer mounted with its shaft substantially parallel to the axle and having gears at the ends of its shaft, flexible driving members extending around the gears on the dynamometer and on the axle, and manually operated means for actuating said lifting jacks simultaneously or independently at will.

8. In a testing device for automobiles, the combination of a pair of lifting jacks set at an angle to a horizontal plane and parallel to each other, means for operating the same independently or simultaneously at will, a dynamometer mounted adjacent the lifting jacks and having a shaft parallel to the axle of the automobile being tested, a wheel on each end of said shaft, a pulley adapted to be secured on each end of said axle, and belts connecting the wheels on the dynamometer and those on the rear axle.

In testimony whereof I have signed this specification in the presence of two subscribing witnesses.

RICHARD T. WINGO.

Witnesses:
EDWARD N. PAGELSEN,
HUGO W. KREINBRING.